United States Patent Office 3,201,360
Patented Aug. 17, 1965

3,201,360
CURABLE MIXTURES COMPRISING EPOXIDE COMPOSITIONS AND DIVALENT TIN SALTS
William R. Proops, Charleston, and George W. Fowler, South Charleston, W. Va., assignors to Union Carbide Corporation, a corporation of New York
No Drawing. Filed Dec. 24, 1959, Ser. No. 861,765
12 Claims. (Cl. 260—18)

This invention relates to epoxide compositions and to the curing of certain epoxides with divalent tin catalysts.

A variety of catalysts have been suggested for use in promoting the cure or polymerization of epoxide compositions into hardened, infusible and insoluble products of relatively high molecular weight, the cured epoxy compound being either in the form of a homopolymer or copolymer with various organic compounds capable of interaction with the active groups of the epoxide. Included among the known catalysts are strongly acidic materials such as sulfuric acid, phosphoric acid, etc.; aromatic sulfonic acids such as toluenesulfonic acid and benzenesulfonic acid; Lewis acids, e.g., boron trifluoride, stannic chloride, etc.; and boron trifluoride-amine complexes such as boron trifluoride-monoethylamine, boron trifluoride-piperidine, and the like. Although these catalysts are effective for the curing or polymerization process, their use has been handicapped to some extent due to a number of reasons. For example, the use of Lewis acid catalysts such as boron trifluoride suffer the disadvantage of effecting rapid and uncontrolled exotherms during the cure of epoxides to resins, frequently causing thermal decomposition in the composition as evidence by charring, or expulsion of components as indicated by bubble formation and foaming. A number of these catalysts are of a corrosive nature and cause uncontrollable gel rates in the cure of certain epoxide formulations which thus seriously limits their industrial application in the field of coatings, adhesives, and potting compositions.

The present invention is based on the discovery that divalent tin compounds selected from the group consisting of stannous acylates and stannous alkoxides are especially effective catalysts for promoting the cure of monoepoxides and polyepoxides of polyglycidyl ethers, hereinafter described. It has been found that the incorporation of stannous acylates or stannous alkoxides in epoxide compounds of the above type provides curable compositions which have a good working life and can be cured at room temperature without incurring rapid gelation or uncontrollable exotherms. The curable compositions can be spread, brushed or sprayed by techniques known in the paint, varnish and lacquer industries, and can be advantageously used in the encapsulation of electrical components. Mixtures of stannous catalysts with epoxides offer the further advantage in that they can be modified with active organic hardeners such as polycarboxylic acids and anhydrides, polyfunctional amines and polyols, to provide epoxy resins having a wide range of varying and preselected properties.

The stannous acylates which are used for purposes of the invention are the divalent tin salts of aliphatic mono- and dicarboxylic acids which contain from 1 to 54 carbon atoms. The acids can be saturated such as acetic acid, 2-ethylhexanoic, etc., or they may be unsaturated acids such as oleic, linoleic, ricinoleic, and the like.

Examples of specific stannous acylates which can be used include: stannous acetate, stannous propionate, stannous oxalate, stannous tartrate, stannous butyrate, stannous valerate, stannous caproate, stannous caprylate, stannous octoate, stannous laurate, stannous palmitate, stannous stearate, and stannous oleate. Of these materials the preferred catalysts are stannous acetate, stannous octoate and stannous oleate.

The stannous compounds which are used may be represented by the formula:

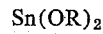

$$Sn(OR)_2$$

in which R is a monovalent hydrocarbon radical, saturated or unsaturated, branched chain or straight chain, containing 1 to 18 carbon atoms, preferably 3 to 12. Representative examples of stannous alkoxides include stannous methoxide, stannous isopropoxide, stannous butoxide, stannous t-butoxide, stannous 2-ethylhexoxide, stannous tridecanoxide, stannous heptadecanoxide, stannous phenoxide, and o, m and p-stannous cresoxides, etc.

Either class of stannous catalysts may be substituted with hydroxy, halo and keto, etc., groups.

In carrying out the invention the stannous catalysts are mixed with epoxides to obtain a homogeneous curable composition. With epoxides that are liquid and viscous, the catalyst can be simply admixed with the epoxide by conventional means as, for example, by stirrers and impellers, etc. When the catalyst and epoxide are immiscible at room temperatures, or if the epoxide is normally solid, the epoxide can be melted or mixed with a liquid organic solvent. Typical solvents include organic ethers such as diethyl ether, methyl propyl ether, etc.; organic esters, such as methyl acetate, ethyl propionate, etc.; and organic ketones such as acetone and cyclohexanone, etc.

The amount of catalyst employed will vary with the cure rate desired and the curing temperature employed. As a general guide good results are obtained by utilizing the stannous catalyst in amounts ranging between 0.001 and 20 percent, preferably 0.1 to 10 percent, by weight, based on the total weight of the curable epoxide composition.

The mixture of epoxide composition and catalyst can be cured over a wide temperature range. For example, the catalyst can be added to the epoxide composition at room temperatures, i.e., about 15 to 25° C., and the cure effected, or if a rapid cure is desired the mixture can be heated to temperatures as high as 250° C. or more. Higher temperatures above 250° C. are generally undesirable due to the discoloration which may be induced. Other single curing temperatures and combinations of curing temperatures can be employed as desired.

The stannous catalysts above described are used to promote the cure of a wide variety of known epoxide compositions, the cured composition produced being in the form of a homopolymer or copolymer with an active organic hardener. The curable epoxide compositions can be monomeric or polymeric, saturated or unsaturated, aliphatic, aromatic or heterocyclic, and can be substituted, if desired, with substituents such as hydroxy, halide, alkyl, aryl, carboxyl, etc.

Epoxides which can be cured are the polyglycidyl polyethers. By the term "polyglycidyl polyether of a polyhydric phenol," as used herein, is meant a polyepoxide compound having terminal epoxy groups, one or more aromatic nucleus or nuclei including fused aromatic nuclei, and at least two aliphatic groups including terminal epoxy-containing aliphatic groups, the aliphatic groups being united to said aromatic nucleus or nuclei through carbon to oxygen to carbon linkages. For brevity, polyglycidyl polyether of a polyhydric phenol is also hereinafter referred to as "polyglycidyl polyethers." By the term "epoxy group, epoxide or polyepoxide," as used herein, is meant a group or organic compound which contains adjacent carbon atoms to which oxirane oxygen is attached, for example,

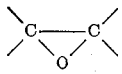

Polyglycidyl polyethers which can be advantageously used as a component in the epoxide compositions of this invention can be characterized by their epoxy equivalents and melting points, or melting point ranges. By the term "epoxy equivalent," as used herein, is meant the weight of polyglycidyl polyether which contains one mol of epoxy group. The epoxy equivalent can be determined by heating a one gram sample of the polyglycidyl polyether with a pyridine solution containing a known quantity of pyridine hydrochloride for about one hour and titrating with sodium hydroxide or potassium hydroxide to determine the amount of unreacted pyridine hydrochloride. From this, the amount of pyridine hydrochloride that has reacted with the epoxy groups of the polyglycidyl polyether can be calculated. From these data the number of grams of polyglycidyl polyether per epoxy group contained thereby, that is, the epoxy equivalent, can be determined by taking one mole of pyridine hydrochloride as equivalent to one mole of epoxy group. Melting point ranges, as used herein, are determined by the Durran's Mercury Method.

Many methods are known in the art for preparing polyglycidyl polyethers. They can be advantageously prepared by the reaction of halohydrins, such as, monohalohydrins, polyhalohydrins, epihalohydrins and the like, with polyhydric phenols. An advantageous method for such a preparation is to heat a dihydric phenol with epichlorohydrin in the presence of sufficient caustic alkali, or other strong aqueous alkali, e.g., potassium hydroxide, to combine with the chlorine of epichlorohydrin. It is preferable to use a stoichiometric excess of alkali so as to insure the complete combination of chlorine. Theoretically, one mol of epichlorohydrin will react with one hydroxyl group of polyhydric phenol to form the polyglycidyl polyether of the phenol. For example, two mols of epichlorohydrin are theoretically required to react with one mol of a dihydric phenol to form the diglycidyl diether of the phenol. In practice, however, a higher ratio than two mols of epichlorohydrin per mol of dihydric phenol has been required in order to form the diglycidyl diether of the phenol. The chain length and extent of polymerization can be varied by changing the mol ratio of epichlorohydrin to dihydric phenol within the range of 10:1 to 1.2:1. Thus, by decreasing the mol ratio of epichlorohydrin to dihydric phenol from 10 towards 1.2, polyglycidyl polyethers having longer chain lengths, higher epoxy equivalents and higher softening points can be obtained. The reaction temperature can be preferably controlled at from 25° C. to 100° C. by regulating the amount of water in the aqueous alkali added or by cooling the walls of the reaction vessel. The overall reaction time can be made to vary from thirty minutes to three hours, or more, depending upon the temperature, proportion of reactants, and method of mixing the reactants. The polyglycidyl polyether product can be recovered from the reaction mixture by methods well recognized in the art.

The lower molecular weight polyglycidyl polyethers which can be formed as described above can be further polymerized by heating with less than equivalent amounts of the same, or different polyhydric phenol, to form longer chain polyglycidyl polyethers. In further polymerizing polyhydric phenols and low molecular weight polyglycidyl polyethers formed by the reaction of a halohydrin and a polyhydric phenol, the phenol and epoxide can be mixed and heated with or without a catalyst. By heating the mixture without a catalyst, polymerization takes place but at a slower rate. Catalysts suitable for accelerating the rate of reaction include alkalis and alkaline reacting substances, acids, salts; basic nitrogen compounds, metallic surfaces, and the like.

Typical halohydrins which can be used in the preparation of the polyglycidyl polyethers include monohalohydrins, e.g., 3-chloro-1,2-propanediol; polyhalohydrins, e.g., glycerol dichlorohydrin, bis(3-chloro-2-hydroxypropyl)-ether, bis(3-chloro-2-methyl-2-hydroxypropyl)ether, 2-methyl 2-hydroxyl-1,3-dichloropropane, 1,4-dichloro-2,3-dihydroxybutane, and the like; and epihalohydrins, e.g., epichlorohydrin, which is preferred. Illustrative of polyhydric phenols which can be used in preparing polyglycidyl polyethers are mononuclear phenols and polynuclear phenols. Typical polyhydric phenols include resorcinol, catechol, hydroquinone, phloroglycinol, and the like. Typical polynuclear phenols include p,p'-dihydroxybi-benzyl, p,p'-biphenol, p,p'-dihydroxyphenyl sulfone, p,p'-dihydroxybenzophenone, 2,2'-dihydroxy-1,1'-dinaphthylmethane, and the 2,2'; 2,3'; 2,4'; 3,3'; 3,4'; and 4,4'; isomers of dihydroxydiphenylmethane etc. Preferred polyglycidyl polyethers are those which contain as reactive groups only epoxy groups and hydroxyl groups. These preferred polyglycidyl polyethers have melting points or melting point ranges of not greater than 160° C.

Other useful polyepoxides include butadiene dioxide, epoxidized polymers and copolymers of butadiene, 9,10-epoxystearyl 9,10-epoxy stearate, ethylene glycol bis(9,10-epoxystearate), and epoxides derived from natural oils, such as linseed oil epoxide, soybean oil epoxide, safflower oil epoxide, tung oil epoxide, castor oil epoxide, lard oil epoxide, etc., which are glycerides containing 45 to 80 carbon atoms.

The epoxides with the stannous catalyst of the type illustrated above can be homopolymerized or copolymerized with an active organic hardner or combination of active organic hardeners. By the term "active organic hardener," as used herein, is meant an organic compound which contains two or more groups which are reactive with epoxy groups. The active organic hardeners illustrated hereinafter are employed in a curing amount, that is, an amount which is sufficient to cause the epoxide system containing the active organic hardener(s) to become polymerized. The active organic hardeners can also be employed in varying amounts so as to give a wide variety of properties to the cured epoxide system. Typical groups which are reactive with epoxy groups are active hydrogen groups such as hydroxyl groups, carboxyl groups, amino groups, thiol groups, and the like; and isocyanate groups, isothiocyanate groups, halide atoms of acyl halides, and the like. Oxydicarbonyl groups such as those contained by polycarboxylic acid anhydrides are also active with epoxy groups. One oxydicarbonyl group will react with two epoxy groups and, in this connection, polycarboxylic acid anhydrides need only contain one oxydicarbonyl group in order to function as an active organic hardener with the epoxide compositions of this invention. Stated differently, one oxydicarbonyl group of an anhydride is equivalent to two epoxy-reactive groups.

Representative active organic hardeners include polyfunctional amines, polycarboxylic acid, polycarboxylic acid anhydrides, polyols, i.e., polyhydric phenols and polyhydric alcohols, polythiols, polyisocyanates, polythioisocyanates, polyacyl halides and others. By the term "polyfunctional amine," as used herein, is meant an amine having at least two active amino hydrogen atoms which can be on the same nitrogen atom or different nitrogen atoms.

Resins having particularly valuable properties can be formed from mixtures containing the epoxide compositions and polyfunctional amines in such relative proportions as provide for 0.2 to 5.0 amino hydrogens of the amine for each epoxy group contained by said epoxide composition. It is preferred to form resins from curable mixtures containing the epoxide compositions and polyfunctional amines which provide from 0.3 to 3.0 amino hydrogens for each epoxy group.

Among the polyfunctional amines contemplated as active organic hardeners include the aliphatic amines, aromatic amines, aralkyl amines, cycloaliphatic amines, alkaryl amines, aliphatic polyamines including polyalkylene polyamines, amino-substituted aliphatic alcohols and phenols, polyamides, addition products of polyamines and low molecular weight epoxides containing oxirane oxygen linked to vicinal carbon atoms, and others.

Typical aliphatic amines include methylamine, ethylamine, propylamine, isopropylamine, butylamine, isobutylamine, 2-ethylhexylamine, 3-propylheptylamine, and the like.

Examples of aromatic amines, aralkyl amines and alkaryl amines include, among others, aniline, o-hydroxyaniline, m-toluidine, 2,3-xylidine, benzylamine, phenethylamine, 1-naphthylamine, meta-, ortho-, and paraphenylenediamines, 1,4-naphthalenediamine, 3,4-toluenediamine and the like.

Illustrative cycloaliphatic amines include cyclopentylamine, cyclohexylamine, p-menthane-1,8-diamine and others.

Among the polyamides, i.e., those having an average molecular weight range from about 300 to about 10,000, include condensation products of polycarboxylic acids, in particular, hydrocarbon dicarboxylic acids, such as malonic acid, succinic acid, glutaric acid, adipic acid, dilinalenic acid, and the like, with polyamines, particularly diamines, such as ethylenediamine, propylenediamine and the like.

Aliphatic polyamines include ethylenediamine, propylenediamine, butylenediamine, pentylenediamine, hexylenediamine, octylenediamine, nonylenediamine, decylenediamine, and the like. Polyalkylene polyamines such as diethylenetriamine, triethylenetetramine, tetraethylpentamine, dipropylenetriamine, and the like, are particularly suitable.

The amino-substituted aliphatic alcohols and phenols suitable for use in the present invention are illustrated by 2-aminoethanol, 2-aminopropanol, 3-aminobutanol, 1,3-diamino-2-propanol, 2-aminophenyl, 4-aminophenyl, 2,3-diaminoxylenol, and the like.

Other illustrations of polyfunctional amines are the addition products of polyamines, in particular, diamines and triamines and epoxides containing oxirane oxygen linked to vicinal carbon atoms, such as ethylene oxide, propylene oxide, butadiene dioxide, diglycidyl ether, epoxidized soybean oil, epoxidized safflower oil, and polyglycidyl polyethers, such as those prepared from polyhydric phenols and epichlorohydrin. Particularly useful polyfunctional amines are the mono- and polyhydroxyalkyl polyalkylene and arylene polyamines which can be prepared by the addition reaction of polyalkylene polyamines, arylene polyamines, and the like, e.g., ethylenediamine, propylenediamine, diethylenetriamine, hexamethylenediamine, triethylenetetramine, tetraethylenepentamine, phenylenediamine, methylenedianiline, xylenediamine, and the like, with ethylene oxide or propylene oxide such that the resulting amine adduct contains two or more active hydrogen atoms attached to either one or more amino nitrogen atoms.

Examples of still other polyfunctional amines suitably adaptable include, among others, heterocyclic nitrogen compounds such as piperazine, 2,5-dimethylpiperazine, and the like; amino-alkyl-substituted heterocyclic compounds such as N-(aminopropyl)-morpholine, N-(aminoethyl)morpholine, and the like; amino-substituted heterocyclic nitrogen compounds such as melamine, 2,4-diamino-6-(aminoethyl)pyrimidine, and the like; dimethylurea, guanidine, p,p'-sulfonyldianiline, 3,9-bis-(aminoethyl)-spirobimetadioxane, hexahydrobenzamide, and others.

Other polyfunctional amines having a total of at least two active amino hydrogen atoms to the molecule can be employed in the epoxide compositions of this invention. For example, such polyfunctional amines as mixtures of p,p'-methylene-dianiline and m-phenylenediamine, or other mixtures of two or more polyfunctional amines can be used.

Another class of active organic hardeners which can be reacted with the epoxide compositions above, are the poly-carboxylic acids. By the term "polycarboxylic acid," as used herein, is meant a compound or polymer having two or more carboxyl groups to the molecule. Curable mixtures can be formed from the epoxide compositions and polycarboxylic acids, which mixtures can be cured to produce a wide variety of useful products. Valuable resins can be made from mixtures containing such amounts of an epoxide composition and polycarboxylic acid as to provide 0.3 to 1.25 carboxyl groups of the acid for each epoxy group contained by the amount of the epoxide composition. It is preferred, however, to make resins from curable mixtures which contain such amounts of polycarboxylic acids and epoxide compositions as to provide 0.3 to 1.0 carboxyl groups of the acid for each epoxy group from the epoxide composition.

Representative polycarboxylic acids include oxalic acid, malonic acid, succinic acid, glutaric acid, adipic acid, pimelic acid, suberic acid, azelaic acid, sebacic acid, alkylsuccinic acids, alkenylsuccinic acids, ethylbutenylsuccinic acid, maleic acid, fumaric acid, itaconic acid, citraconic acid, mesaconic acid, glutaconic acid ethylidenemalonic acid, isopropylidenemalonic acid, allylmalonic acid, muconic acid, alphahydromuconic acid, beta-hydromuconic acid, diglycollic acid, dilactic acid, thiodiglycollic acid, 4-amyl-2,5-heptadienedioic acid, 3-hexynedioic cid, 1,2-cyclohexanedicarboxylic acid, 1,4-cyclohexanedicarboxylic acid, 2-carboxy-2-methylcyclohexaneacetic acid, phthalic acid, isophthalic acid, terephthalic acid, tetrahydrophthalic acid, tetrachlorophthalic acid, 1,8-naphthalene-dicarboxylic acid, 3-carboxycinnamic acid, 1,2-naphthalenedicarboxylic acid, 1,1,5-pentanetricarboxylic acid, 1,2,4-hexanetricarboxylic acid, 2-propyl,1,2,4-pentanetricarboxylic acid, 5-octene-3,3,6-tricarboxylic acid, 1,2,3-propanetricarboxylic acid, 1,2,4-benzenetricarboxylic acid, 1,3,5-benzenetricarboxylic acid, 3-hexane-2,2,3,4-tetracarboxylic acid, 1,2,3,4-benzenetetracarboxylic acid, 1,2,3,5-benzenetetracarboxylic acid, benzenepentacarboxylic acid, benzenehexacarboxylic acid, polymerized fatty acids derived from natural oils, e.g., linseed oil, tung oil, soybean oil, dehydrated castor oil, etc., including mixtures thereof, which have a molecular weight within the range of 500 to 5000, and the like.

Also, as polycarboxylic acids useful in the polymerizable compositions there are included compounds containing ester groups in addition to two or more carboxy groups which can be termed polycarboxy polyesters of polycarboxylic acids, such as those listed above, or the corresponding anhydrides of said acids, esterified with polyhydric alcohols. Stated in other words, by the term "polycarboxy polyesters," as used herein, is meant polyesters containing two or more carboxy groups per molecule. These polycarboxy polyesters can be prepared by known condensation procedures, employing mol ratios favoring greater than equivalent amounts of polycarboxylic acid, or anhydride. More specifically, the amount of polycarboxylic acid, or anhydride, employed in the esterification reaction should contain more carboxy groups than are required to react with the hydroxyl groups of the amount of polyhydric reactant.

Polyhydric alcohols which can be employed in preparing these polycarboxy polyesters include dihydric alcohols, such as ethylene glycol, diethylene glycol, triethylene glycol, tetraethylene glycol, 1,2-propylene glycol, 1,3-propylene glycol, dipropylene glycols, tripropylene glycols, polyoxyethylene glycols, polyoxypropylene glycols, 1,2-butylene glycol, 1,4-butylene glycol, pentane-1,5-diol, pentane-2,4-diol, 2,2-dimethyltrimethylene glycol, hexane-1,4-diol, hexane-1,5-diol, hexane-1,6-diol, hexane-2,5-diol, 3-methylpentane-1,5-diol, 2-methylpentane-2,5-diol, 3-methylpentane-2,5-diol, 2,2-diethylpropane-1,3-diol, 2,2-diethylhexane-1,3-diol, 2,5-dimethylhexane-2,5-diol, octadecane-1,12-diol, 1-butene-3,4-diol, 2 - butene - 1,4 - diol, 2 - butyne - 1,4 - diol, 2,5 - dimethyl-3-hexyne-2,5-diol and the like; trihydric alcohols such as glycerol, trimethylolethane, hexane - 1,2,6 - triol, 1,1,1-trimethylolpropane, and the ethylene oxide and propylene oxide adducts thereof; tetrahydric compounds, such as pentaerythritol, diglycerol, and the like; and higher polyhydric compounds such as pentaglycerol, dipentaerythritol, polyvinyl alcohols and the like. Additional polyhydric alcohols useful in making polycarboxy polyesters can be prepared by the reaction of epoxides, e.g., diglycidyl diethers of 2,2-propane bisphenol, and reactive hydrogen-containing organic compounds, e.g., amines, polycarboxylic acids, polyhydric compounds and the like. In forming the polycarboxy polyesters it is preferable to use a dihydric, trihydric or tetrahydric aliphatic or oxaaliphatic alcohol. The mol ratios in which the polycarboxylic acid or anhydride can be reacted with polyhydric alcohols in preparing polycarboxylic polyesters useful in the compositions are those which provide polyesters having more than one carboxy group per molecule.

Curable mixtures containing the epoxide compositions and polycarboxylic acid anhydrides can also be employed to produce resins having diversified and valuable properties. Particularly valuable resins can be made from mixtures containing such amounts of polycarboxylic acid anhydride and epoxide compositions as to provide 0.2 to 3.0 carboxy equivalent of the anhydride for each epoxy group of the epoxide composition. It is preferred, however, to make resins from curable mixtures which contain such amounts of polycarboxylic acid anhydride and epoxide composition as to provide 0.4 to 2.0 carboxy equivalent of anhydride for each epoxy group contained by the amount of epoxide concentration.

Typical polycarboxylic acid anhydrides include succinic anhydride, glutaric anhydride, propylsuccinic anhydride, methylbutylsuccinic anhydride, hexylsuccinic anhydride, heptylsuccinic anhydride, pentenylsuccinic anhydride, octenylsuccinic anhydride, nonenylsuccinic anhydride, alpha, beta-diethylsuccinic anhydride, maleic anhydride, chloromaleic anhydride, dichloromaleic anhydride, itaconic anhydride, citraconic anhydride, hexahydrophthalic anhydride, hexachlorphthalic anhydride, tetrahydrophthalic anhydride, methyltetrahydrophthalic anhydride, tetrachlorphthalic anhydride; hexachloroendomethylenetetrahydrophthalic anhydride, otherwise known as chlorendic anhydride, tetrabromophthalic anhydride, tetraiodophthalic anhydride; phthalic anhydride, 4-nitrophthalic anhydride, 1,2-naphthalic anhydride; polymeric dicarboxylic acid anhydrides, or mixed polymeric dicarboxylic acid anhydrides such as those prepared by the autocondensation of dicarboxylic acids, for example, adipic acid, pimelic acid, sebacic acid, hexahydroisophthalic acid, terephthalic acid, isophthalic acid, and the like. Also, other dicarboxylic acid anhydrides, useful in our polymerizable compositions include the Diels-Alder adducts of maleic acid and alicyclic compounds having conjugated double bonds, e.g., methylbicyclo-[2.2.1]heptene-2,3-dicarboxylic anhydride.

Thermoset resins can be prepared from mixtures containing the epoxide compositions and polyols by providing 0.1 to 2.0, preferably from 0.2 to 1.5, hydroxyl groups of the polyol for each epoxy group contained by the amount of the epoxide composition. By the term "polyol," as used herein, is meant an organic compound having at least two hydroxyl groups which are alcoholic hydroxyl groups, phenolic hydroxyl groups, or both alcoholic and phenolic hydroxyl groups. The epoxide composition and polyol can be mixed in any convenient manner. A preferred method, however, is to mix the polyol and epoxide composition in the liquid state so as to obtain a uniform mixture. In forming this mixture it may be necessary to raise the temperature of the polyol and epoxide composition to at least the melting point or melting point range of the highest melting component. Temperatures below about 150° C. are preferred so as to avoid possible premature curing of these curable mixtures. Stirring also aids the formation of a homogeneous mixture.

Representative polyols include ethylene glycol, diethylene glycol, polyethylene glycols, propylene glycol, dipropylene glycol, polypropylene glycols, trimethylene glycols, butanediols, pentanediols, 12,13-tetracosanediol, glycerol, polyglycerols, pentaerythritol, sorbitol, polyvinyl alcohols, cyclohexanediols, inositol, dihydroxytoluenes, resorcinol, catechol, bis(4-hydroxyphenyl)-2,2-propane, bis(4-hydroxyphenyl)methane, and the ethylene and propylene oxide adducts thereof, etc.

The following examples illustrate the best mode now contemplated for carrying out the invention.

In the following examples the examination or description of the resins were conducted at room temperature, i.e., about 22° C. Barcol hardness values were determined by the use of Barcol Impressor GYZJ–934–1 at room temperature.

EXAMPLES 1–2

In the following examples the diglycidyl ether of bis-(4-hydroxyphenyl)propane [Bisphenol A] was admixed in the proportions indicated with a hardener system consisting of a polyol and polycarboxylic acid anhydride. The temperature of the mixture was maintained at about 22 to 28° C. until a cured or partially cured resin was obtained. The results are shown below in Table I.

*Table I*

| Example No. | Epoxide | Grams | Organic Hardener | Grams | Catalyst | Grams | Percent | Resin Description |
|---|---|---|---|---|---|---|---|---|
| 1 | Diglycidyl ether of Bisphenol A. | 62.5 | Maleic Anhydride; Hexanetriol. | 12.0, 4.4 | None | | | Remained liquid after 6 days. |
| 2 | ----do---- | 62.5 | ----do---- | 12.0, 4.4 | Stannous Octoate | 0.8 | 1.0 | Tack free on top after 6 days. |

EXAMPLES 3–14

The effectiveness of stannous catalysts for increasing the reactivity of epoxides such as the polyglycidyl polyethers with or without active organic hardeners is illustrated in Table II. The diglycidyl ether of bis(4-hydroxyphenyl)propane (Bisphenol A) and stannous octoate were mixed with various hardeners and the resulting mixtures heated to the indicated temperatures. Gel times were observed and the resins were post cured at 160° C. A control containing no catalyst was included for comparison.

Table II

| Example No. | Hardener | Grams | Ratio [1] | Stannous Octoate | | Gel time | | Cure | | Description |
|---|---|---|---|---|---|---|---|---|---|---|
| | | | | Grams | Percent [2] | Hours | °C. | Hours | °C. | |
| 3 | None | | | None | | None | None | 21 | 160 | Viscous liquid. |
| 4 | do | | | 0.027 | 1.35 | None | None | 21 | 160 | Highly viscous liquid. |
| 5 | do | | | 0.054 | 2.7 | 10.5 | 160 | 19 | 160 | Flexible, tough. |
| 6 | do | | | 0.081 | 4.0 | 6 | 160 | 19 | 160 | Rigid, tough. |
| 7 | 1,2,6-Hexanetriol | 0.23 | 0.5 | 0.027 | 1.17 | 18–21 | 160 | 27 | 160 | Hard, brittle. |
| 8 | do | 0.23 | 0.5 | None | | None | None | 27 | 160 | Highly viscous liquid. |
| 9 | Methyl Nadic Anhyd.[3] | 0.9 | 1.0 | 0.027 | 0.93 | 2.25 | 160 | 11 | 160 | Strong, Barcol, 45. |
| 10 | do.[3] | 0.9 | 1.0 | None | | 10.5 | 160 | 19 | 160 | Strong, Barcol, 44. |
| 11 | Toluene diisocyanate | 0.44 | 0.5 | 0.027 | 1.11 | 27 | 120 | 27 | 120 | Strong, Barcol, 46. |
| | | | | | | 6.5–9 | 160 | 15.5 | 160 | |
| 12 | do | 0.44 | 0.5 | None | | 27 | 120 | 27 | 120 | Brittle, weak. |
| | | | | | | 6.5–9 | 160 | 15.5 | 160 | |
| 13 | p,p'-Methylenedianiline | 0.5 | 1.0 | 0.027 | 1.08 | <0.5 | 50 | 4 | 50 | Strong, Barcol, 30. |
| | | | | | | | | 1 | 120 | |
| | | | | | | | | 6 | 160 | |
| 14 | do | 0.5 | 1.0 | None | | 4 | 50 | 4 | 50 | Strong, Barcol, 33. |
| | | | | | | <0.33 | 120 | 1 | 120 | |
| | | | | | | | | 6 | 160 | |

[1] Ratio of reactive groups per epoxide group.
[2] Based on the weight of epoxide and hardener.
[3] Methylbicyclo[2.2.1]heptene-2,3-dicarboxylic anhydride.

EXAMPLES 15–24

The catalytic activity of stannous catalysts upon monoepoxides is illustrated by reacting n-butyl glycidyl ether with various organic hardeners shown below in Table III.

Table III

| Example No. | Name Hardener | Wt., g. | Ratio of Reactive Groups [1] | Stannous Octoate [2] | | Condition after heating for 20 hrs. at 120° C. |
|---|---|---|---|---|---|---|
| | | | | Grams | Percent | |
| 15 | None | | | 0.065 | 5 | Yellow liquid. More vicous than No. 16. |
| 16 | do | | | None | | Clear liquid. Not viscous. |
| 17 | Adipic acid | 0.36 | 0.5 | 0.034 | 2 | Yellow liquid. More viscous than No. 18. |
| 18 | do | 0.36 | 0.5 | None | | Yellow liquid. Viscous |
| 19 | Phthalic anhydride | 0.74 | 1.0 | 0.04 | 2 | Brown, clear, very viscous liquid. |
| 20 | do | 0.74 | 1.0 | None | | Yellow, needle crystals immobilized total mixture (unreacted phthalic anhydride). |
| 21 | Hexanetriol | 0.23 | 0.5 | 0.03 | 2 | Clear yellow liquid. More viscous than No. 22. |
| 22 | do | 0.23 | 0.5 | None | | Yellow liquid. Immiscible bottom layer. |
| 23 | Bisphenol A | 0.64 | 0.5 | 0.038 | 2 | Clear yellow liquid. Vicous. No. 23 is much more viscous than No. 24. |
| 24 | do | 0.64 | 0.5 | None | | Clear yellow liquid. |

[1] Ratio of the reactive groups in the hardener for 1 epoxy group. 1.3 grams of n-butyl glycidyl ether was used in all cases.
[2] Based upon epoxide plus hardener.

EXAMPLE 25

To 2.5 grams of soybean oil epoxide was added 0.9 gram of methyl nadic anhydride (methylbicyclo-[2.2.1] heptane-2,3-dicarboxylic anhydride) and 0.068 gram of stannous octoate. The mixture was heated to 120° C. and held there for 195 minutes. After cooling to room temperature, a tough flexible resin was obtained. When this same example was repeated in an identical manner without catalyst, a rubbery soft resin was obtained.

What is claimed is:

1. A curable mixture consisting essentially of (A) a divalent tin compound selected from the group consisting of stannous salts of aliphatic monocarboxylic and dicarboxylic acid having up to 54 carbon atoms and stannous compounds having the formula:

$$Sn(OR)_2$$

wherein R is selected from the group consisting of saturated and unsaturated, substituted and unsubstituted hydrocarbyl groups having from 1 to 18 carbon atoms, the substituents thereon being selected from the group consisting of hydroxy, halo and keto, (B) a polyepoxy compound selected from the group consisting of polyglycidyl polyethers of polyhydric phenols having a melting point range not greater than 160° C., butadiene dioxide, epoxidized polymers and copolymers of butadiene, 9,10-epoxystearyl-9,10-epoxystearate, glycol bis(9,10-epoxystearate) and epoxidized glycerides having from 45 to 80 carbon atoms, and (C) a curing amount of an organic hardener of the group consisting of polyfunctional amines having at least 2 hydrogen atoms contiguously attached to nitrogen, polycarboxylic acids, polycarboxylic acid anhydrides, polyols having at least two hydroxyl groups selected from the group consisting of alcoholic and phenolic hydroxyl groups, polythiols, polyisocyanates, polythioisocyanates, polyacyl halides and mixtures of the aforesaid hardeners.

2. A curable composition consisting essentially of (A) a divalent stannous salt of the formula:

$$Sn(O\overset{O}{\overset{\|}{C}}R')_2$$

wherein R' is an aliphatic hydrocarbyl radical having from 2 to 18 carbon atoms, (B) a polyglycidyl polyether of a polyhydric phenol having a melting point range not greater than 160° C. and (C) a curing amount of an organic hardener of the group consisting of polyfunctional amines having at least 2 hydrogen atoms contiguously attached to nitrogen, polycarboxylic acids, polycarboxylic acid anhydrides, polyols having at least two hydroxyl groups selected from the group consisting of alcoholic and phenolic hydroxyl groups, polythiols, polyisocyanates, polythioisocyanates, polyacyl halides and mixtures of the aforesaid hardeners.

3. The curable composition of claim 2 wherein the said stannous salt is stannous octoate.

4. The curable composition of claim 2 wherein the said stannous salt is stannous oleate.

5. The curable composition of claim 2 wherein the said organic hardener is a mixture of maleic anhydride and hexanetriol.

6. A curable composition consisting essentially of (A) a stannous salt of the formula:

$$Sn(OCR')_2$$

wherein R' is an aliphatic hydrocarbyl radical containing from 2 to 18 carbon atoms, (B) an epoxidized glyceride having from 45 to 80 carbon atoms, and (C) a curing amount of an organic hardener of the group consisting of polyfunctional amines having at least 2 hydrogen atoms contiguously attached to nitrogen, polycarboxylic acids, polycarboxylic acid anhydrides, polyols having at least two hydroxyl groups selected from the group consisting of alcoholic and phenolic hydroxyl groups, polythiols, polyisocyanates, polythioisocyanates, polyacyl halides and mixtures of the aforesaid hardeners.

7. A curable composition consisting essentially of (A) a stannous compound of the formula:

$$Sn(OR'')_2$$

wherein R'' is a hydrocarbyl group containing from 3 to 12 carbon atoms, (B) a polyglycidyl polyether of a polyhydric phenol having a melting point range not greater than 160° C. and (C) a curing amount of an organic hardener of the group consisting of polyfunctional amines having at least 2 hydrogen atoms contiguously attached to nitrogen, polycarboxylic acid anhydrides, polyols having at least two hydroxyl groups selected from the group consisting of alcoholic and phenolic hydroxyl groups, polythiols, polyisocyanates, polythioisocyanates, polyacyl halides and mixtures of the aforesaid hardeners.

8. A curable composition consisting essentially of a stannous salt of the formula:

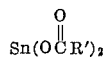
$$Sn(OCR')_2$$

wherein R' is an aliphatic hydrocarbyl radical containing from 2 to 18 carbon atoms and (B) a polyglycidyl polyether of a polyhydric phenol having a melting point range not greater than 160° C.

9. The composition of claim 8 wherein the said stannous salt is stannous octoate.

10. The composition of claim 8 wherein the said stannous salt is stannous oleate.

11. A curable composition consisting essentially of a stannous salt of the formula:

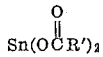
$$Sn(OCR')_2$$

wherein R' is an aliphatic hydrocarbyl radical containing from 2 to 18 carbon atoms, and (B) an epoxidized glyceride containing from 45 to 80 carbon atoms.

12. A curable composition consisting essentially of (A) a stannous compound of the formula:

$$Sn(OR'')_2$$

wherein $R_2'$ is a hydrocarbyl radical containing from 3 to 12 carbon atoms and (B) a polyglycidyl polyether of a polyhydric phenol having a melting point range not greater than 160° C.

References Cited by the Examiner

UNITED STATES PATENTS

| | | | |
|---|---|---|---|
| 2,731,429 | 1/56 | Cody et al. | 260—22 |
| 2,767,158 | 10/56 | Schlenker et al. | 260—47 |
| 2,801,228 | 7/57 | Stark et al. | 260—47 |
| 2,866,057 | 12/58 | Peck | 260—18 |
| 2,933,459 | 4/60 | Gurgiolo | 260—2 |
| 2,935,488 | 5/60 | Phillips et al. | |
| 3,117,099 | 1/64 | Proops et al. | |

LEON J. BERCOVITZ, *Primary Examiner.*

A. M. BOETTCHER, A. D. SULLIVAN, MILTON STERMAN, *Examiners.*